Patented July 5, 1927.

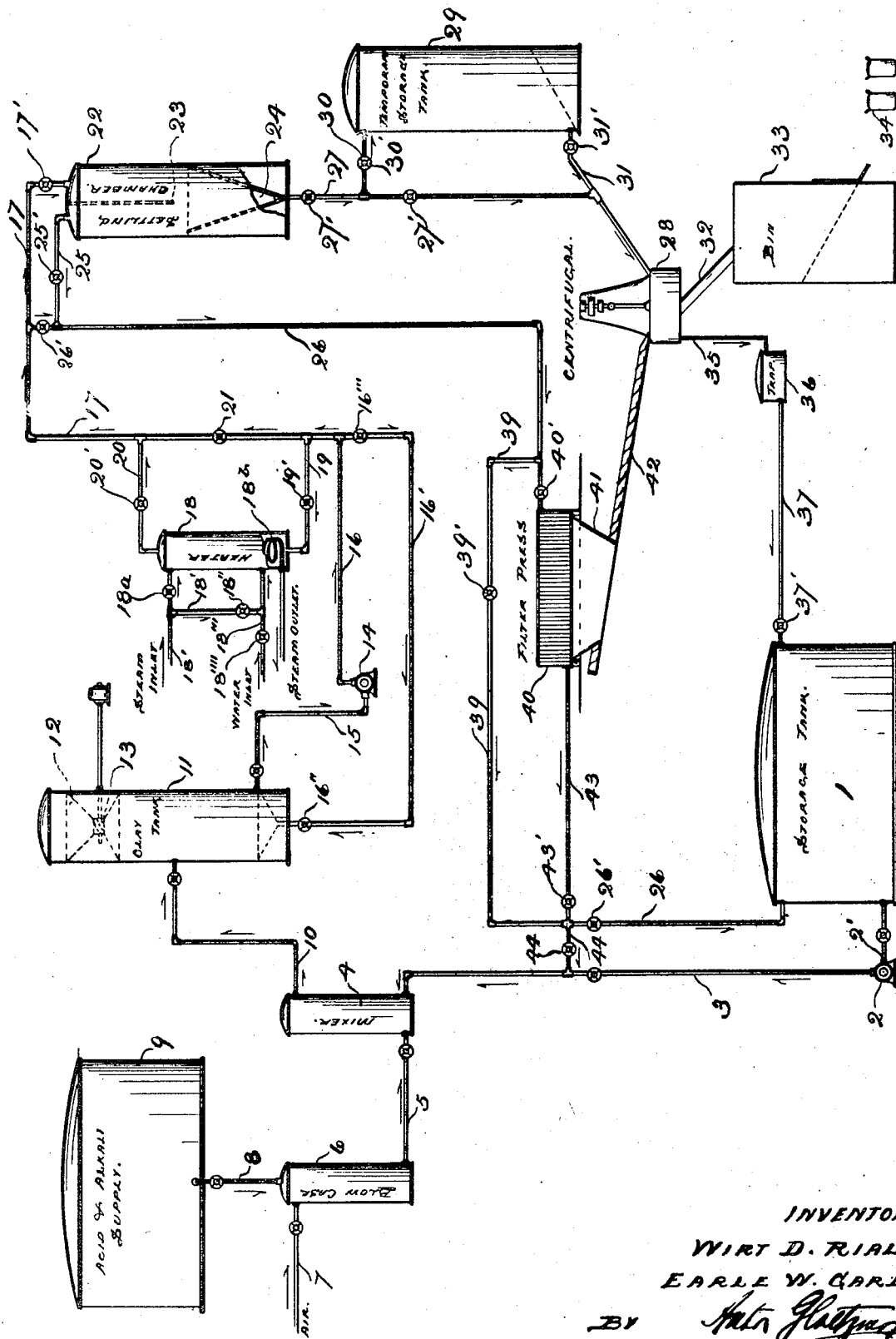

1,634,514

UNITED STATES PATENT OFFICE.

WIRT D. RIAL AND EARLE W. GARD, OF WILMINGTON, CALIFORNIA.

PROCESS OF PREPARING AN ADSORBENT FOR OILS.

Application filed September 8, 1925. Serial No. 55,007.

This invention relates to a material for use in treating hydrocarbon oils of the petroleum or vegetable class for purposes of purification by absorption, filtration or bleaching and it has particular reference to an earthy material and to a method of producing the same for the desired uses in the oil industry.

The invention relates chiefly to the treatment of clays and clayey materials and earths generally designated as colloidal clay and hydrosilicate that may find use for filtering and otherwise treating oils, such materials comprising the usual clays at present employed in the art, diatomaceous earths, montmorillonite, and others. The treatment of these clays forming the subject of this invention is to provide, at small cost of time, labor and apparatus, a clayey material with an acid content for the purpose of treating oils to obtain the effect of the acid upon them and subject them further to the filtering, bleaching or other action of the clay, the prime object of the invention being to provide a simple method by which these earthy materials may be made ready for use economically, and continuously without waste and which will eliminate the expensive systems at present in vogue.

A further object of the invention is to provide a method of treating clays and kindred earths, as a counterpart of an oil treating system involving the use of clays, in which the treated clays may be recovered for further use in the same system.

A further object of the invention is to provide a simple method of treating clays and kindred materials in which the expensive drying and other equipment, needed at present in the preparation of clayey material is eliminated, in which the clayey material may be treated with an acid-treated oil similar to the oil which the clay is to treat, thereby avoiding additional cost and to provide a simple system in which the clay material may be re-used continuously until its effect upon the oil treated is exhausted.

Other objects will appear from the specification following in connection with the accompanying drawing which is illustrative of a system in which the various steps of the process may be executed, the view disclosing a diagrammatic plan of interrelated, cooperative apparatus for effecting the purposes of this invention.

In the practice of this invention, clay or clayey materials, are acid treated by commingling with them an oil, previously treated with an acid whereby the acid content of the oil is adsorbed by the clay, and this method we have found preferable to a direct mixing with the clay of the acid because the acid, under conditions of vigorous agitation with the oil is intimately mixed and dispersed throughout the oil body, and hence is the more readily adsorbed by the clay when in such disrupted condition, that is, in a condition in which the acid or alkali is broken up into fine particles. We have found that the clay thus treated will adsorb, to the point of saturation of the clay, the acid disseminated through the oil, and that also a small proportion of the oil will be adsorbed by the clay, and that the undesirable content of oil may be readily discharged or expelled from the clay without interfering with the adsorbed acid content of the clay, except that proportion of acid which is in excess of saturation of the clay. The removal of the adsorbed oil, we have found, is best accomplished by centrifugal force which leaves the clay practically free of oil. The clay thus treated is then ready for immediate use in treating oils for any of the purposes for which clays are used, and the use of the clays treated, may be continuous until exhaustion of the acid strength in the clay and impairment of the clay, in respect of its adsorptive qualities as well as of its bleaching and filtering properties, has occurred. It will be obvious that the clay thus treated may be used immediately or kept for future use, but it is more economical continuously to make and use the clay until unfit for further use with the oil treated. While the clay is spent in treating certain oils, it is still available for further use in treating other oils.

The method as outlined, of treating clays for use in treating oils, is, in point of economy, ease of control, and consumption of labor and material, superior to any of the methods, heretofore used, and in addition to yielding a clay with an acid content in needed proportion, may serve the purpose of treating an oil simultaneously with the production of the clay.

While any of the available clays may be used for the purposes herein set out, and it will be understood that any clay is included in this disclosure, we prefer to use a magnesium silicate because our experience shows better results with this class than with any other.

From a supply tank 1, through valved line 2', oil is delivered by a pump 2, through valved line 3 into a mixer 4, in which the proper amount of acid is thoroughly mixed with the oil. The acid is introduced under pressure into the mixer 4, through valve contained line 5 from a blow case or pump 6, air being supplied for pressure purposes, where the blow case system is employed, from a suitable source, not shown, through valve controlled line 7, and acid being furnished through valved line 8 from a suitable supply vessel 9.

In the mixer 4, referred to, oil and acid are agitated vigorously to effect as nearly, as may be, a perfect action of the acid upon the oil and such action is the more effective where the oil and acid are broken into minute globules or particles. In this preliminary treatment of the oil, we remove or place in condition for removal, the greatest percentage of undesirable matters foreign to, or appearing in, the oil as a result of refining, or other treatment.

When the oil and acid have been thoroughly mixed, the mixture is forced through valved line 10 from the top of mixer 4 into a tank 11, to which clay, or other earthy material suited to the purpose, is supplied from a hopper 12, in amounts variably controlled by any well known mechanical agency, as a power feed, shown at 13. We find that the use of about one pound of acid to the barrel of oil is approximately the correct proportion to maintain. By means of a pump 14, the mixture of oil and acid and clay is drawn through valved line 15 from the bottom of the tank 11, and forced through line 16 into line 17. In order to maintain the bodies in a state of agitation and intimately mixed, we may re-circulate the mixture or part of same through the pump 14, which is preferably of the centrifugal type. The mixture or portion of same for this purpose, may be diverted from flowing through line 17, and caused to flow through line 16' back to the bottom of the tank 11, this line 16' provided with a valve 16'' to control the circulation and agitation of the mixture in the tank 11. A valve 16''' on line 16' co-operates with the valve 16'' to cause the flow of the mixture directly into line 17. This circulation and re-circulation may occur during and without interfering with the free normal flow of the mixture through the system, and prevents settling and stratification of the components of the mixture, in the line 16 and also in the tank 11. Such re-circulation also enables the clay the more efficiently to adsorb the acid content of the oil, and evenly distributes the acid throughout the clay.

The mixture passing through line 17, may continue, as presently described, or may be caused to travel through a heater 18, of any desirable type, and supplied with any convenient medium of heat. The heater 18 is connected at the bottom to line 17 through pipe 19, having a valve 19', to control the inflow of the mixture to said heater 18, and at the top, the heater is connected to the line 17 through pipe 20, having a valve 20' for governing the outflow of the mixture from the heater back into the main line 17, a valve 21, being provided on said line 17, and intermediate the pipes 19 and 20 to shut off the flow of the mixture directly through said line 17, when it is desired to by-pass such mixture through the heater 18. We subject the mixture to heat in the heater 18 to effect a greater and more thorough adsorption of the acid by the clay. While we find, regardless of heavy precipitates of impurities from the mixture, that acid adsorption of the clay takes place to a greater or lesser extent, depending entirely upon any impairment caused by the coating of the clay particles, we find also that this curtailment of the adsorptive efficiency of the clay is offset by subjecting the mixture to heat, which causing the mixture to expand, brings the acid into intimate contact with the clay, with the result that the percentage of adsorption of the clay is as high as is possible to obtain, and equally as high as where the clay and acid are directly mixed together. Obviously there will be little or no impedance of the adsorbing or filtering properties of the clay, where the oil used in conjunction with the acid, which the clay is to take up, has been priorly acid treated and the tarry and gummy residues removed therefrom. In that case, the oil is clear and will remain clear, practically throughout the whole process of treating the clay. In any event, heating the mixture is more conductive to a perfect assimilation by the clay of the acid carried by the oil, and the temperature which we find most advantageous does not exceed 375° F.

In the practice of this invention on many oils, we find that a substantially water-dry clay is preferable and yields the best results. This is particularly true with refined hydrocarbons of the lighter gravities. We have discovered, however, that on certain oils, other than the refined hydrocarbons of the lighter gravities, a water-dry clay or one substantially water-dry, does not work with the satisfaction and efficiency of a clay containing water in determinate quantities. This is especially true of lubricating oils, where we have found a water content of from 10% to 15% is far superior to a clay containing no or a negligible amount of moisture.

Where the raw clay used is deficient in the amount of water, that deficiency may be supplied either in the form of free water or water vapor, to the heater 18, through which the mixture of oil, acid and clay is passing. Water vapor or steam may be supplied to the mixture through line 18', controlled by valve 18''; water may be supplied through line 18''' leading from a suitable source, and controllable by a valve 18''''. Both these fluids, in addition to furnishing the required quantity of water, may maintain the mixture in a state of agitation within the heater 18, which, while heretofore designated a heater, may have the additional function of a means for mixing the water or water vapor with the clay of the mixture passing therethrough. By means of a valve 18ª, the heating fluid may be either wholly or partly diverted from the heating coil 18ᵇ in the heater 18 to the line 18'.

It being understood that the mixture is under a pressure from the pump 14, the further progress of the mixture occurs through line 17 which is connected to the top of a settling chamber 22 and through which line 17 the mixture is delivered into this chamber 22, and to one side of a partition 23, vertically suspended therein a determinate distance above the cone-shaped bottom 24. This chamber 22 is of a diameter sufficient to cause the velocity of the incoming mixture to drop to a point at which the clay will readily settle out of the oil. The supernatant oil, rising on the other side of the partition 23, however, is forced out of said chamber 22, through line 25 having valve 25' and into line 26, the line 26 being connected to the line 17 and the flow from said line 17 into line 26 being controlled by valve 26', and the valve 25' on the line 25, serving to control the flow of fluid from the chamber 22 to the line 26. When by-passing the mixture from line 17 into line 26, the valve 17' is closed; valve 25' on line 25 is closed and valve 26' is opened. The clay which has settled out from the mixture, with the acid content of the oil absorbed, passes from the conoidal bottom 24 of the chamber 22, through valved line 27 into a centrifuge 28. To prevent splashing of the clay, and to increase storage of treated clay and at times to help the operation at the point of delivery into the centrifuge, the clay may be directed to a tank 29, through line 30 having a valve 30', and caused to gravitate from said tank 29 through a pipe 31 having valve 31' at the bottom of tank and leading into the centrifuge 28. When the clay is diverted into the tank 29, the passage of same through the line 27 is prevented by a valve 27'. The clay which has settled in the conoidal bottom of the tank 22 is forced out from said tank under pressure of the pump 14 to the centrifuge, directly or through the circuit just described. This settling out in the chamber 22, represents substantially the bulk of the clay contained in the liquid or mixture, the balance which has not collected in the chamber and which is still in suspension, being carried out of said chamber 22, into line 26, for recovery in another manner, as explained presently.

Except that small percentage of oil which resists mechanical separation from the clay by reason of the intimate union with it, all oil still contained in the clay when it is delivered to the centrifuge, is expelled from the clay by centrifugal force, which throws out the liquid from and through the clayey mass and performs, in addition an excellent and thorough filtration. The clay relieved of its oil content, but with its acid or alkali charge undisturbed, is discharged from the centrifuge through the chute 32 into a bin 33 from which the treated clay is received and apportioned in bags 34 or other convenient receptacles for further use. The liquid or oil which is expelled from the clay passes from the centrifuge 28, through line 35 into a trap 36 in which sedimentary and other foreign matters settle and accumulate, especially should a leak develop in the filter cloth of the centrifuge, and from the trap 36, the oil, cleaned and ready for use, travels through line 37 to a storage tank 1, this line 37 provided with a valve 37' for controlling the flow therethrough.

As stated above, the supernatant oil, which has separated out from the clay in the chamber 22, passes out of the chamber through the line 26, into a filter press 40 of known type and construction, and composed of filter leaves suspended within a case, the leaves interposed in the path of flow of the oil and separating by filtration the clay or clayey material carried in the oil. After the expression of the clay from the oil by this filtration method, the clay is delivered into a hopper 41, from which it enters preferably a screw conveyor 42, by which the clay is returned to the centrifuge for further treatment for the purpose of extracting from it, to the smallest globules, the oil still contained therein. These small extractions of clays are likewise collected in the bin 33 for further distribution. The oil from which the suspended clay bodies or particles have been removed, is carried through the lines 43 and 26 into the storage tank 1, valves 43' and 26'' respectively, being provided on said pipes 43 and 26 to control the flow, as appearing presently. The liquid from the chamber 22, however, may be caused to circumvent the filter press 40, especially where, the supernatant oil is clean of suspended clay particles and no need for treatment in the filter press exists. This diversion of the flow may be effected by closing the valve 40', on the line 26 leading to the press, closing the valve 43' on the line 43 leading from the filter press 40; closing a valve 44' on line 44, connecting the line 26 with the initial supply line 3, and opening the valves 39' on line 39 and valve 26' respectively on opposite sides of the connecting line 43. In this wise, the liquid may travel past the filter press, and directly into the receiving or storage tank 1, or under the pressure exerted upon the fluid in the lines by the pump 14, the fluid, may be forced back into the line 3, and into the mixer 4 for further use in treating other clays. This is effected by opening the valve 39', closing the valve 26' on line 26 and opening the valve 44' on line 44; or by by-passing the fluid through line 26, filter 40 and line 43, leading from the filter 40. The oil may therefore be re-circulated and re-used for treating other clays, so soon as it leaves or separates from the clay in the chamber 22. It may thus enter continuously into the treatment of the clay, or it may be, as stated, delivered to the storage tank 1, from which the cleaned oil may be pumped through the line 3.

In carrying out the process, oil and acid are mixed in the mixer 4, and the clay to be treated is then added to this mixture. By using an oil as a carrier for the acid, we are able not only to bring about an intimate contact with hydrosilicates with consequent high adsorption, but in addition, the oil used to treat the hydrosilicates is also treated. By practicing the process in this wise, oils and also the hydrosilicates may be simultaneously treated, thereby avoiding the necessity for separate treatment and special handling of the hydrosilicate, with the high costs incident upon this manner of operation.

We find that many of the hydrosilicates that are used in the treatment of oils, especially of the hydrocarbon type and class, show an augmented capability for absorption when heated, whereby hygroscopic water and also constitutional water may be driven off; but that heat must not be great enough to work injury to the fine, minute and delicate structure of the hydrosilicate, by reason of which its decolorizing power, its filtering quality, and its adsorbing properties may be destroyed. Such treatment by heat of the hydrosilicate follows the mixing of same with the mixture of acid and oil. On the other hand, we find, in many cases, that far better results are obtained by not removing the water content of the clay, or at least not below 10%, and that, should the quantity be not present in the clay, we add the necessary amount in either the form of water or vapor.

After thoroughly mixing the hydrosilicate, oil and acid, which mixing is the greater and more intimate in the presence of heat, the mixture is delivered to a settling chamber 22, the bottom of which, constituting a quiet zone, permits the hydrous silicate with its adsorbed acid content to settle out from the liquid or oil, while the oil, separating from the clay, passes out of the settling chamber 22, and is conducted to a filter press in which whatever clayey particles have been entrained or carried over in suspension by the oil are extracted, and the extracted clay conveyed to the centrifuge. The clay or hydrous silicate under centrifugal force expels the major portion of the oil which the clay has adsorbed. In this centrifuge 28, the speed of which may be regulated to control the amount of oil desired expelled from the clay, the clay may be continuously discharged from the settling chamber, and the continuous expulsion of the contained oil effected. It is found that only such a small amount of oil is retained by the clay as will prevent it from caking or balling, but the centrifugal force has practically no effect upon the acid adsorbed by the clay. In ordinary practice, we find that the amount of oil in the treated clay does not exceed 5%.

The clay removed from the centrifuge is then ready for immediate use, and its use continued until its power of treatment, whether by reason of exhaustion of the acid content or by virtue of the loss of its natural adsorptive properties and filtering and bleaching capabilities, has been impaired.

The oil used in the treatment is returned to tank 1, from which it was originally taken, and may be returned through the line for treating other clays; or other oils that are to be treated may be added to the treated oil in the vessel 1, or entirely new oil used for the double purpose of treating the oil and treating the clay simultaneously.

What we claim, is:

1. The process of preparing an adsorbent for liquid petroleum oils which consists in mixing sulfuric acid with a purified liquid petroleum distillate, in then mixing water insoluble clay with such mixture of acid and distillate, in agitating the mixture, and in then expelling the excess distillate.

2. The process of preparing an adsorbent for liquid petroleum oils which consists in mixing sulfuric acid with a liquid petroleum distillate from which impurities have been removed, in adding a water insoluble clay to the mixture of acid and distillate, in agitating the mixture to effect a thorough dissemination of the acid in the oil, and in then removing from the clay the excess oil whereby the resultant clay contains the acid previously contained in the oil.

3. The process of preparing an adsorbent for liquid petroleum oils which consists in mixing sulfuric acid with a treated liquid petroleum distillate, in agitating the mixture to effect a thorough dissemination of the acid in the oil, in adding a water insoluble clay to the mixture, in agitating the resultant mixture in the presence of heat, in settling out the clay from the distillate, and in then expelling from the clay the remaining excess distillate.

4. In the treatment of clays to prepare same as an adsorbent for liquid hydrocarbon oils, the method which consists in mixing a water insoluble clay with a sulfuric acid containing purified liquid petroleum distillate, in intensely agitating the mixture, and in then removing the remaining excess distillate, thereby producing an acid clay in which the particles thereof are covered by a protective film of oil which prevents any evaporation of the acid or part of the acid.

5. A clay containing sulfuric acid, the particles of the clay being coated with a film of oil.

In testimony whereof we have set our hands.

WIRT D. RIAL.
EARLE W. GARD.